3,154,600
METHACRYLATE SIRUPS AND THEIR PREPARATION, AND PREPARATION OF REINFORCED PLASTIC ARTICLES EMPLOYING SAME
George Edward Munn, Wilmington, Del., assignor to E. I. du Pont de Nemours and Company, Wilmington, Del., a corporation of Delaware
Continuation of application Ser. No. 773,762, Nov. 13, 1958. This application Mar. 18, 1963, Ser. No. 271,832
3 Claims. (Cl. 260—884)

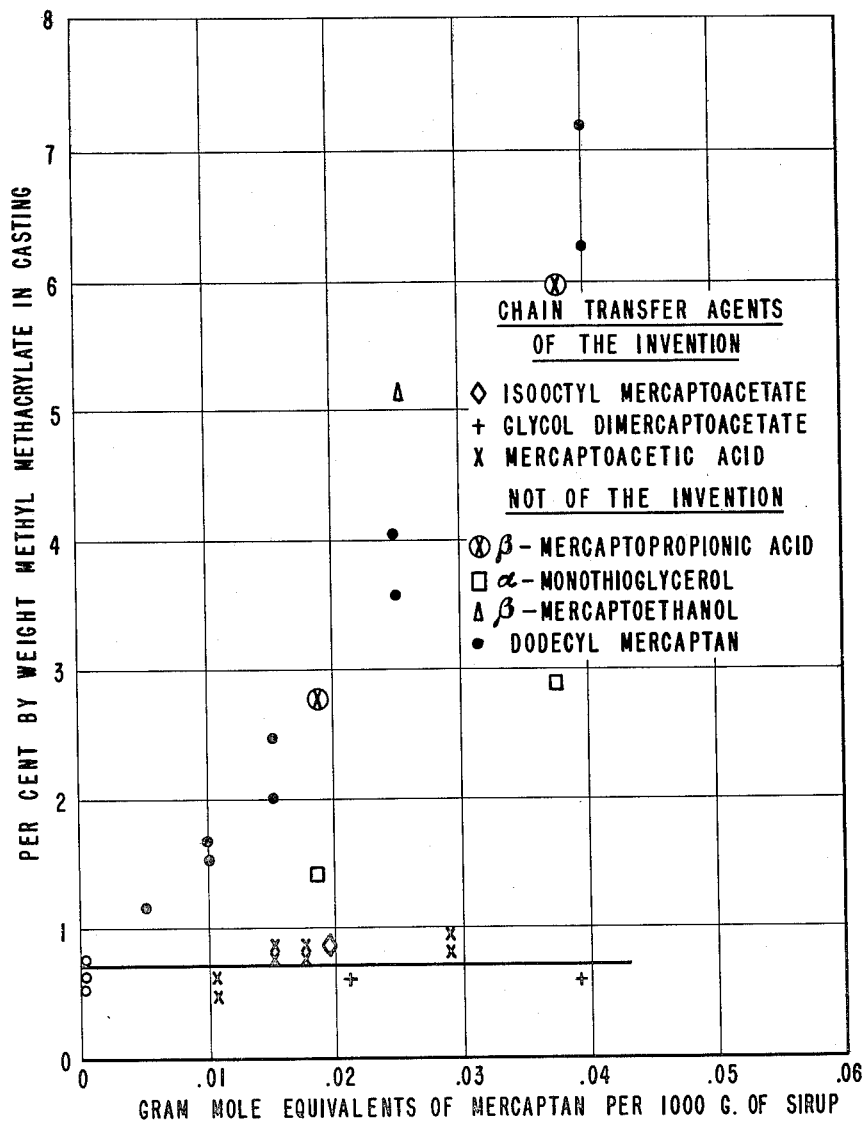

This invention relates to new compositions of matter containing partially polymerized methacrylates containing chain transfer agents suitable as laminating compositions and more particularly to monomer-polymer sirups of methacrylic ester compositions, processes for their preparation and use.

Prior to the present invention, no fully acrylate or methacrylate monomer-polymer sirup has been available to the fabricator that was stable, had a useful viscosity, and sufficiently high concentration of polymer such that it could be molded at a high rate to give, in the presence or absence of pigments, fillers or the like, markedly improved laminate articles having superior weathering, stiffness, and craze-resistant properties. The invention provides such sirups and methods of using them.

Fabrication of laminates from methacrylate sirups can be accomplished at a faster rate if the monomer content of that sirup is less than 80% by weight. In order to achieve this low monomer content and still have a sirup with a useful viscosity, it is necessary to use a chain transfer agent in preparing the sirup. The chain transfer agents used prior to this invention have an adverse effect on the fabrication properties of such sirups so that long cure times are necessary to fabricate end-use products having monomer contents below 2.0%. Inferiority is evidenced on weathering of laminates containing high monomer content. Moreover, fiber prominence and blooming indict weathered laminates containing high monomer contents. The chain transfer agents in the sirups of this invention have no adverse effect on the fabrication properties so that fibers, fillers and the like can be impregnated with the sirups of this invention and the resulting product can be fabricated at rapid rates into end-use products having monomer contents well below 2.0%.

Objects of the present invention are to provide improved monomer-polymer sirups; a process for producing these sirups; and processes for their polymerization and products produced therefrom. Another object is to provide monomer-polymer sirups with relatively high concentrations of polymer of low inherent viscosity. A further object is to provide monomer-polymer sirups of acrylic and methacrylic esters of relatively low exothermicity and shrinkage during final molding and polymerization. Another object is to provide chain transfer agents which product laminates of low methacrylate monomer content. Still another object is to provide stable and flowable sirups of monomer and polymer-containing methacrylic acid esters and a process for molding, polymerizing and cross-linking the sirups in the presence of fibers, to weather-resistant articles. Other objects and advantages of the invention will appear hereinafter.

The invention relates to the preparation of polymer-in-monomer and copolymer-in-monomer sirups containing at least 10% by weight of polymeric methyl methacrylate, or a copolymer containing methyl methacrylate in monomeric methyl methacrylate that can be mixed with or absorbed by fibrous materials and thereafter molded, polymerized and cured to give weather-resistant articles containing resin at least 98% by weight polymerized.

The sirups of the invention can, in accord with a feature of the invention, be made shelf-stable, have a flowable viscosity to permit easy use, a ratio of polymer to monomer to provide a minimum of shrinkage, and a minimum exotherm of polymerization, consistent with good physical properties fo the product laminates. Moreover, the sirup can be polymerized to a product having superior weatherability, due to low monomer content. Furthermore, the sirups of the invention contain cross-linking agents which produce fabricated plastic products on final polymerization that possess superior physical properties and surface qualities, and that are capable of being formed at the rapid rates demanded by modern industry to produce polymeric resins of low monomer content. A preferred embodiment of the invention can be more particularly characterized as involving the preparation of a methacrylate polymer or copolymer in methacrylate monomer as a sirup, containing 10 to 35% by weight of polymer that is markedly useful to impregnate fibers, fillers, and the like, the monomer content of the impregnated product being polymerizable at a rapid rate due to the use of the mercaptans described below which do not inhibit polymerization or curing of the last 10% of monomer. Moreover, the cured polymers of the invention contain less than 2% monomer content based on the weight of polymer.

Polymeric products of the invention are produced from sirups of partially-polymerized methacrylates which contain a chain transfer agent having the following structure:

(a) 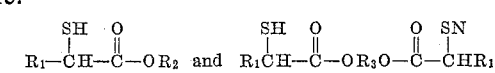

in which (b) $R_1$=hydrogen, alkyl, aryl, carboxymethyl, carboalkoxymethyl, $R_2$=hydrogen, alkyl, aryl alkoxyalkyl, alkoxyalkoxyalkyl, and $R_3$=alkylene, polyalkylene, alkylene oxide and polyalkylene oxide.

The aforesaid chain transfer agents are unique in their ability (1) to regulate the molecular weight in the siruping stage of making polymer-in-monomer and copolymer-in-monomer sirups in order to produce sirups of high polymer content with relatively low viscosity and (2) not to inhibit the polymerization during the second stage of the process when the sirup is polymerized to a resin containing minimal amounts of monomer in comparatively short polymerization cycles, e.g., up to about 10 minutes for polymerization of the last 10% of monomer. Other chain transfer agents such as the alkyl mercaptans, 2 - mercaptoethanol, 2 - mercaptopropionic acid, monothioglycerol, etc., if they satisfy requirement (1) fail in requirement (2), for the products after the polymerization stage contain more than the amount of monomer that can be tolerated.

Monomer-polymer sirups of the invention are made from any suitable polymerizable organic compound containing monovinyl unsaturation, such as vinyl acetate, styrene, alkyl acrylates, alkyl methacrylates, etc., and more especially from the methacrylic esters such as methyl methacrylate. Methyl methacrylate may be used with other polymerizable vinyl compounds such as the ethyl acrylates and the like, in which use the methyl methacrylate constitutes at least 50% by weight of the resin content of the composition used. Such comonomers can be chosen to modify properties of the sirup and product laminates. Care should be exercised in choice of comonomer so as not to affect adversely weatherability, heat resistance, stability, etc.

Effectiveness for subsequent molding is obtained if a sirup has a relativley low exothermicity and a low shrinkage. A sirup with low exothermicity is one which on polymerization of its monomer content gives a minimum heat of reaction. Such a sirup is produced by increasing the polymer-to-monomer ratio, for the higher the polymer content, the lower will be the exothermicity of the polymerization of the sirup.

The sirups of the invention are distinguished from monomer-polymer solutions of the art in the following respects:

(a) The inherent viscosity (a measure of molecular weight) of the polymer portion of the sirup which is selected high enough to insure good physical properties of the product laminates but low enough to allow use of relatively high polymer content with resultant low shrinkage and exothermicity, thereby enabling and facilitating fabrication into reinforced plastic structures;

(b) The presence of the carbonyl-substituted mercaptans insure rapid polymerization in the final stage of the process to end-use products containing reduced monomer content; and (c) The presence of 0.1 to 20.0% of a divinyl compound (such as ethylene dimethacrylate) which improves the physical properties of the product laminates while at the same time increasing the speed of cure and thereby improving the ease and economics of fabrication.

(d) This last distinguishing property of the sirup constitutes an alternative feature of the invention; excellent storage stability of the sirup is attained from extremely low residual initiator content and the presence of only faint traces of polymerization inhibitors.

Prior art monomer-polymer sirups have been made by partially polymerizing methyl methacrylate without the use of transfer agents or due regard for the proper type and quantity of initiator or siruping time and temperature thus leading to sirups which on the one hand were not storable or shippable, as is usually required in the laminating industry, or on the other, were polymerized in the presence of chain transfer agents that inhibited polymerization. Alternatively, they have been made by dissolving commercially - available, fully - polymerized acrylic polymers in methyl methacrylate monomer to produce sirups of suitable viscosity. These commercial polymers are expensive and of inherent viscosity (0.44–2.0) such that only a limited concentration of polymer could be used, thereby resulting in sirups of relatively high shrinkage and exothermicity.

The sirups of the present invention having bulk viscosities in the range of 0.5 to 50 poises constitutes balanced formulae containing polymers of low inherent viscosity, 0.25 to 1.0, and preferably 0.30 to 0.55, and with correspondingly high polymer content and suitable quantities of crosslinking agents to provide optimum physical properties and desirable curing characteristics. The inherent viscosity is determined at 20° C. in chloroform solution at a concentration of 0.50 gram/100 ml. according to the method described in F. W. Billmeyer, Textbook of Polymer Chemistry, Interscience Publishing Inc. (1957), p. 128.

The sirup of the invention may be prepared by any suitable process such, for example, as by partially polymerizing monomer (i.e., methyl methacrylate) by a process that will produce the prescribed polymer or by dissolving the described amount of polymer having the prescribed inherent viscosity in the monomer. Forming the polymer, in situ, is the preferred method. By such a method, a chain transfer agent of the invention is present during polymerization of the methyl methacrylate. The reaction should be catalyzed, moreover, with only sufficient polymerization initiator to produce the desired amount of polymer if a sirup of superior storage stability is desired.

The prepared sirup, for use in molding and in the preparation of laminate articles containing fibers, fillers and the like, has a viscosity in poises, at 25° C., of 50 or less and preferably between 2 and 15. The preparation of such a sirup necessarily involves the use of the aforesaid low viscosity polymer, either formed in situ or by solution, dissolved in sufficient amounts of monomer as described hereinabove, that sirup giving on polymerization a composition having not only a low shrinkage and exothermicity acceptable to the fabricator but also a laminate article having superior properties.

The sirup is preferably made by heating a small amount of a polymerization initiator in solution in an inhibitor-free acrylic or methacrylic ester in the presence of the chain transfer agent of the invention at suitable pressure and temperature until the solution has reached a predetermined viscosity, thereafter the hot solution is quenched by the addition of cold monomer containing a polymerization inhibitor. More specifically, a sirup having a viscosity between about 0.5 and 50 poises at 25° C. and preferably between 2 and 15 poises at that temperature, can be produced from methyl methacrylate by heating monomeric methyl methacrylate in a stirred jacketed kettle under reflux, at atmospheric pressure in the presence of a predetermined small amount of initiator and from 0.05 to 1.0 mole percent, and preferably from 0.1 to 0.4 mole percent of the chain transfer agent. This solution is heated at a temperature between 50 and 150° C. and preferably 95° C. to 105° C., until the predetermined viscosity of the solution has been attained and until the initiator content has been reduced to below 20 p.p.m. The polymerization is then stopped by cooling in any suitable manner, as for example and preferably, by the addition of from 1 to 10 percent by weight of cold methyl methacrylate containing sufficient hydroquinone to inhibit completely the polymerization of the methyl methacrylate.

The sirup as thus prepared has a long storage life because the initiator used is substantially all consumed to leave no more than about 20 p.p.m. of initiator after polymerization, and this small amount is not effective as an initiator for the reaction because of the presence of the polymerization inhibitor.

The stable sirup is an article of commerce that is sold to fabricators for use in their molding operations. The fabricator mixes the stable sirup with a suitable polymerization initiator, and preferably a filler, and subjects the resulting mixture (or sirup if no filler is added) to a molding operation in which the sirup is converted to a solid shape simultaneously with the polymerization of its monomer content.

Sirups of the invention, if they are to be polymerized shortly after formation, can be made with or without extensive shelf-life stability. The advantages of the use of the chain transfer agents of the invention are not materially influenced by the degree of stability of the sirup.

Sirups of the invention reduce difficulties during shaping, due to comparatively low monomer content of the sirup. This results in low exothermicity during shaping and polymerization, in contrast with prior art sirups. The reduced exothermicity makes it possible to process parts rapidly and without blemishes, such as bubbles, flow lines, etc.

Another alternate feature of the invention relates to the presence of a crosslinking agent more fully characterized hereinafter. This agent improves the fabricability, physical properties, and weathering of the molded product, particularly when fibrous reinforcement is present.

The examples which follow describe preferred embodiments of the invention for making the sirup in which parts are by weight unless otherwise noted.

EXAMPLE I

A stirred, water-jacketed kettle provided with a reflux condenser was charged with 1000 parts of inhibitor-free, monomeric methyl methacrylate and about 1.8 parts of mercaptoacetic acid. The resulting solution was heated to 80° C.±1° C. and then 0.30 part of alpha,alpha'azobisisobutyronitrile dissolved in 5.0 parts of methyl methacrylate added. The jacket temperature was adjusted to 100° C.±1° C. and the kettle contents were allowed to reach reflux temperature, ca. 103° C. Samples were taken periodically from the reaction mixture and measured for viscosity. When the viscosity reached about 10 poises (on a sample cooled to 25° C.), the reaction was quenched by the addition of a 25° C. solution containing 0.038 part by hydroquinone dissolved in 80.0 parts of methyl methacrylate. This point was reached in about 40 minutes after addition of the initiator.

The resulting sirup contained no detectable initiator, had a viscosity of about 10 poises at 25° C., had a polymer content of about 30%, an inherent viscosity of about 0.40, and a good shelf stability, i.e., substantially no color change or viscosity change after 30 days.

EXAMPLE II

The process of Example I was repeated for the preparation of a sirup with these changes: 3.3 parts of glycol dimercapto acetate replaced mercaptoacetic acid and the sirup contained 31.0% methacrylate polymer having an inherent viscosity of 0.37.

EXAMPLE III

The process of Example I was repeated for the preparation of sirup with these changes: 3.6 parts of dodecyl mercaptan replaced the mercaptoacetic acid and the sirup had an inherent viscosity of 0.42. This sirup also had good shelf-stability with little detectable color change vs. viscosity change in 30 days.

In the table which follows, sheets formed from the sirups of Examples I, II and III are compared for monomer content. The percent methyl methacrylate monomer remaining in the sheets after various intervals in the press are shown in the table.

*Table*

| Min. in Press at 115° C. | Percent Methyl Methacrylate Monomer Remaining in Sheet | | |
|---|---|---|---|
| | Example I Mercaptoacetic Acid | Example II Glycol dimercapto acetate | Example III Dodecyl Mercaptan |
| 4 | 1.6 | 0.9 | |
| 5 | 1.2 | 0.7 | 3.7–4.1 |
| 7 | 0.8 | 0.6 | 2.0–2.4 |
| 10 | 0.7 | | 1.7–2.0 |

2-mercaptoethanol, monothioglycerol and 2-mercaptopropionic acid substantially duplicate the results of dodecyl mercaptan in their retardation of polymerization of the last 10% of monomer.

EXAMPLE IV

Sirups were prepared consisting of 28–32% methyl methacrylate polymer dissolved in methyl methacrylate monomer and containing about 0.04 mole of the chain transfer agent per 1000 g. of sirup. 0.85% benzoyl peroxide was dissolved in the sirup and the resulting mixture was heated in a press for 7 minutes at 115° C. forming a sheet 0.070 to 0.100 inch in thickness. The percent methyl methacrylate monomer in this sheet was determined to measure the completeness of the polymerization reaction. The lower content of methyl methacrylate monomer in the sheets fabricated from sirup containing the substituted mercaptans of the invention (isooctyl mercaptoacetate, glycol dimercaptoacetate, and mercaptoacetic acid) are compared to that of sheets fabricated from sirup containing the mercaptan of the art (β-mercaptopropionic acid, α-monothioglycerol, β-mercaptoethanol, and dodecyl mercaptan), are shown in FIGURE 1.

Any suitable free-radical polymerization initiator may be used, such as a peroxygen initiator, e.g., benzoyl peroxide, diethyl peroxide, diisobutyl peroxide; the azo initiators of the Hunt patent, U.S. 2,471,959, issued May 31, 1949, and the like. To produce a sirup, only part of the methyl methacrylate is polymerized. The initiators present in the sirup after polymerization will, even at or below room temperature, and at a slow rate, continue polymerization. Sirup which contains initiator is potentially viscosity-unstable. If a storable sirup is to be made, no more than small amounts of the initiator should be used, therefore, to insure that, when quenched, there is insufficient initiator remaining to cause undesirable polymerization.

Two factors govern the choice of conditions for a practical polymerization cycle. The conditions must be such that the polymerization rate is fast enough to be economically attractive, and secondly, the conditions must be such that the initiator is almost completely reacted. The polymerization rate can be calculated from the initiator concentration and temperature by equations well known in the chemical literature (see P. J. Flory, Principles of Polymer Chemistry, Cornell University Press (1953), p. 114). The approximate amount of initiator which can be added to the polymerization system and still not have too much remaining after siruping can be calculated in accordance with the formula $X=10^{-3}.2^{Pt/H}$, where X is the weight percent of initiator added prior to polymerization, H is the half-life of the initiator, and $Pt$ is the polymerization time. (Any acceptable method for measuring the half-life of the initiator can be used, such as that described in the chemical literature, or that of Arthur W. Barry et al., application S.N. 614,824 filed October 9, 1956.)

A chain transfer agent to the extent of from 0.01 to 1.0 mole percent is used to control polymerization and give a polymer having the prescribed inherent viscosity. A sirup containing such polymers can be quenched quickly to stop the polymerization at the desired amount.

The quenching liquid used is a monomer of the ester being polymerized in which a suitable inhibitor for vinyl polymerization has been dissolved to the extent of preferably 10 to 100 parts per million parts of the sirup. Examples of such initiators are hydroquinone, the catechols, the pyrocatechols and other known inhibitors which are soluble in the monomer. The liquid solution containing .001 to 1% by weight of inhibitors at a temperature between 0 and 30° C. is added to the polymerizing sirup. This amount of inhibitor in cold monomer is sufficient in combination with cooling water in the jacket of the polymerization kettle to stop polymerization of the low molecular weight acrylic sirups, by reducing the temperature of the kettle contents to about 60° C. or lower.

The viscosity of the sirup can be measured by any standard method such as Gardner tube, Brookfield viscosimeter, or the like. In the specification and claims, the viscosity given was measured by comparison with standard viscosity samples in Gardner viscosity tubes.

The cross-linking agent is added to the sirup in amounts up to 20% by weight after the quenching is completed. Any suitable poly-unsaturated, cross-linking agent may be used, such, for example, as ethylene dimethacrylate, proylene dimethacrylate, polyethylene glycol dimethacrylate, divinyl benzene, triallyl cyanurate, and diallyl phthalate.

If desired, a portion, i.e., up to about 2% of the cross-linking agent may be added to the sirup prior to quenching.

The storable sirups of the invention are marketed as such for a multiplicity of uses in which suitable polymerization initiators are added to polymerize the monomer contained in the sirup, the final polymerization being conducted by techniques similar to those presently used in polyester laminating and potting technology. The sirups may be mixed with inert additives such as glass fibers, powdered metals, pigments, natural and synthetic fibers, and other toughening, filling, coloring and/or strengthening materials; sheets may be made by pouring the sirup on a corrugated or flat surface before or after a fabric, metal or glass layer is placed on the surface; and the sirup may be used as a laminating layer for wood, plastic, and other surfaces. Subsequent to the aforesaid operations in matched metal molds, or by contact process, the sirup is polymerized under some pressure, e.g., 0.1 to 2000 p.s.i. and temperatures between room temperature and 150° C., to substantially 100% polymer or by any suitable molding process. For optimum properties, the products should be cured under elevated temperatures up to 125° C. and pressures up to 500 p.s.i. until the monomer content of the sirup has been reduced to a low level (preferably less than 1% based on polymer content). Where low pressures are used it is sometimes necessary to eliminate dissolved gases by evacuation of the sirup prior to use.

The storable, stable methacrylate sirups of the invention are capable of being shipped from the point of manufacture to the fabricator without undesirable polymerization of monomer content. The fabricator is able to store the sirup without danger of polymerization until he wishes to use it. The sirup can then be combined with the fibers, fillers, etc. as described, molded, laminated or otherwise treated, without excessive exothermicity, to polymerize the monomer content to superior products. The sirups of the invention whether storable or produced for immediate use produce polymerizates containing small amounts of monomer from which end use products can be produced having substantially no tendency to bloom and having excellent resistance to weathering without discoloration.

This application is a continuation of application Serial No. 773,762, filed November 13, 1958, now abandoned.

I claim:

1. A polymer-in-monomer sirup, adapted and arranged for the preparation of plastic articles containing at least 20% by weight of a methacrylate resin, having superior weather resistance and less than 2% by weight of monomeric methacrylate resin based on the polymer content of the plastic article, comprising a sirup containing 10 to 35% by weight of methyl methacrylate polymer, with an inherent viscosity between 0.25 and 1.0, as determined at 20° C. in chloroform solution at a concentration of 0.5 gram per deciliter, dissolved in monomeric methyl methacrylate, the sirup having a viscosity in poises at 25° C. of less than 50, and containing from 0.01 to 1.0 mole percent of a chain transfer agent of the group consisting of such agents having the following chemical structures:

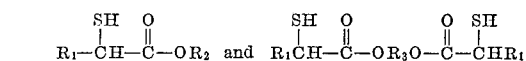

in which the R groups consist of the following substituents:

$R_1$=hydrogen, lower alkyl, aryl, carboxymethyl, carboalkoxymethyl, $R_2$=hydrogen, lower alkyl, aryl, alkoxyalkyl, alkoxyalkoxyalkyl, and $R_3$=alkylene, polyalkylene, alkylene oxide and polyalkylene oxide.

2. The polymer-in-monomer sirup of claim 1 containing up to 20% by weight of a polyunsaturated monomer as cross-linking agent.

3. In the process of preparing reinforced plastic articles containing at least 20% by weight of methyl methacrylate polymer, having superior weather resistance and less than 2% by weight of monomeric methyl methacrylate based on the weight of polymer present, the steps which comprise impregnating a reinforcing material with a sirup having a viscosity in poises at 25° C. of less than 50 and containing 10 to 35% by weight of methyl methacrylate polymer, with an inherent viscosity between 0.25 and 1.0, as determined at 20° C. in chloroform solution at a concentration of 0.5 gram per deciliter, the sirup containing from 0.01 to 1.0 mole percent of a chain transfer agent of the group consisting of such agents having the following chemical structures:

in which the R groups consist of the following substituents:

$R_1$=hydrogen, alkyl, aryl, carboxymethyl, carboalkoxymethyl, $R_2$=hydrogen, alkyl, aryl, alkoxyalkyl, alkoxyalkoxyalkyl, and $R_3$=alkylene, polyalkylene, alkylene oxide and polyalkylene oxide, subjecting the thus impregnated material to polymerization, and effecting the polymerization of the last 10% of the monomeric methyl methacrylate present in the impregnated material in less than 10 minutes.

References Cited in the file of this patent

UNITED STATES PATENTS

| | | |
|---|---|---|
| 2,335,133 | Renfrew | Nov. 23, 1943 |
| 2,413,973 | Hawk et al. | Jan. 7, 1947 |
| 2,558,139 | Knock et al. | June 26, 1951 |
| 2,870,118 | Bader et al. | Jan. 20, 1959 |

FOREIGN PATENTS

| | | |
|---|---|---|
| 495,705 | Belgium | Nov. 13, 1950 |
| 582,010 | Great Britain | Nov. 1, 1946 |